US009139120B2

(12) United States Patent
Morimoto

(10) Patent No.: US 9,139,120 B2
(45) Date of Patent: Sep. 22, 2015

(54) SEAT CUSHION FRAME FOR VEHICLE

(71) Applicant: TOYOTA BOSHOKU KABUSHIKI KAISHA, Aichi-ken (JP)

(72) Inventor: Takeshi Morimoto, Tajimi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 123 days.

(21) Appl. No.: 13/751,562

(22) Filed: Jan. 28, 2013

(65) Prior Publication Data
US 2013/0193737 A1    Aug. 1, 2013

(30) Foreign Application Priority Data

Feb. 1, 2012   (JP) ................................. 2012-019686

(51) Int. Cl.
*B60N 2/68* (2006.01)
*B60N 2/427* (2006.01)

(52) U.S. Cl.
CPC .............. *B60N 2/68* (2013.01); *B60N 2/42718* (2013.01)

(58) Field of Classification Search
CPC .............................. B60N 2/68; B60N 2/42718
USPC ........................................ 297/452.2, 452.18
See application file for complete search history.

(56) References Cited

U.S. PATENT DOCUMENTS

| | | | | |
|---|---|---|---|---|
| 4,673,215 A * | 6/1987 | Yokoyama | ................ | 297/452.18 |
| 5,284,381 A * | 2/1994 | Aoki et al. | ................ | 297/452.18 |
| 5,913,567 A * | 6/1999 | Novak et al. | ................ | 297/216.1 |
| 8,371,655 B2 * | 2/2013 | Nonomiya | ................ | 297/452.18 |
| 8,506,016 B2 * | 8/2013 | Mizobata | ................. | 297/452.18 |
| 8,616,653 B2 * | 12/2013 | Fukuda | ...................... | 297/452.2 |
| 2009/0108132 A1 * | 4/2009 | Guttropf | .................... | 244/122 R |
| 2010/0096895 A1 * | 4/2010 | Nonomiya | ............... | 297/344.15 |
| 2011/0209924 A1 | 9/2011 | Endo et al. | | |
| 2011/0298269 A1 * | 12/2011 | Mizobata | ................. | 297/452.18 |
| 2012/0217775 A1 * | 8/2012 | Fujita et al. | ............... | 297/216.13 |
| 2013/0119715 A1 * | 5/2013 | Medoro et al. | ............. | 297/180.1 |
| 2013/0119741 A1 * | 5/2013 | Medoro et al. | ........... | 297/452.18 |
| 2013/0221725 A1 * | 8/2013 | Yamada et al. | .......... | 297/452.18 |
| 2013/0341484 A1 * | 12/2013 | Yamada et al. | ............... | 248/636 |

FOREIGN PATENT DOCUMENTS

| | | |
|---|---|---|
| JP | 2001-145538 | 5/2001 |
| JP | 2006-038813 | 2/2006 |
| JP | 2011-073548 | 4/2011 |

OTHER PUBLICATIONS

U.S. Appl. No. 13/751,415 to Takeshi Morimoto, filed Jan. 28, 2013.
Chinese Office Action for CN App. No. 201310042146.8 issued on Jul. 3, 2015, along with English-language translation thereof.
Japanese Office Action for JP App. No. 2012-019686 issued on May 19, 2015, along with English-language translation thereof.

* cited by examiner

*Primary Examiner* — David R Dunn
*Assistant Examiner* — Timothy J Brindley
(74) *Attorney, Agent, or Firm* — Greenblum & Bernstein, P.L.C.

(57) ABSTRACT

Longitudinal frame bodies that are disposed on both sides are coupled to each other by lateral frame bodies at the front side and the rear side to form a seat cushion framework, and a panel is fixed to both of the longitudinal frame bodies to cover, from above, a space between front ends of the longitudinal frame bodies that includes the front-side lateral frame body. A panel side of the front-side lateral frame body includes a concave portion to increase a distance from the panel.

13 Claims, 5 Drawing Sheets

SEAT CUSHION FRAME FOR VEHICLE

INCORPORATION BY REFERENCE

The disclosure of Japanese Patent Application No. 2012-019686 filed on Feb. 1, 2012 including the specification, drawings and abstract is incorporated herein by reference in its entirety.

BACKGROUND OF THE INVENTION

1. Field of the Invention

The present invention relates to a seat cushion frame for a vehicle in which a front side and a rear side between longitudinal frame bodies disposed on both sides are each coupled by a lateral frame body to form a framework of a seat cushion and in which a panel is fixed to both of the longitudinal frame bodies such that a space between front ends of the longitudinal frame bodies that includes the front-side lateral frame body is covered from above.

2. Description of Related Art

In a vehicle collision, there is a possibility of a phenomenon that a body of a passenger seated on a seat slides on the surface of the seat and falls forward while being restricted by a seatbelt, which is a so-called submarine phenomenon. At this time, it is necessary that an excessive impact load does not apply to a passenger from a viewpoint of passenger protection. For this reason, peripheral parts of a seat have conventionally been devised in various ways. Japanese Patent Application Publication No. 2001-145538 (JP 2001-145538 A), which is described below, discloses the invention in which a part of a seatback frame is easily modifiable to prevent application of an excessive load to a passenger's lower back in a vehicle collision. In addition, some of the vehicles have a seat cushion that is deformed in a front part to work against a load applied from the upper front of a seat cushion and also to absorb energy that is generated by a passenger moving forward under a seat by a submarine phenomenon in a vehicle collision.

SUMMARY OF THE INVENTION

Some of the vehicular seats cannot be deformed enough to absorb the energy that is caused by the submarine phenomenon. It is because a front-side lateral frame body, which constitutes a seat framework, is disposed under a panel, which constitutes a front part of the seat, and deformation of the panel is blocked by the front-side lateral frame body even when the panel is deformed by the impact load, which eventually leads to shortage in absorption of the energy caused by the deformation of the panel. In view of such a problem, a problem to be solved by the present invention is to deform a front-side lateral frame body in advance to secure a space between the lateral frame body and a panel so that the panel is deformed by an impact load that is associated with a submarine phenomenon and the impact load can be absorbed by the front part of a seat.

In an aspect of the present invention, longitudinal frame bodies that are disposed on both sides of a seat cushion framework are coupled to each other in a front side and a rear side by lateral frame bodies. A panel is fixed to both of the longitudinal frame bodies to cover, from above, a space between the front ends of the longitudinal frame bodies that includes the front-side lateral frame body. A vehicular seat cushion frame includes a concave portion such that a panel side of the front-side lateral frame body increases a distance from the panel. In the seat cushion frame for a vehicle of the aspect of the invention, because the panel side of the front-side lateral frame body includes the concave portion to increase the distance from the panel, the panel can be deformed substantially when receiving an impact load accompanied by a submarine phenomenon, and thus it is possible to increase an energy-absorbing amount in a front side of a seat.

In the above aspect, the front-side lateral frame body may include a concave portion in a manner that an external cross-sectional area of a portion that is located between coupling sections of both of the longitudinal frame bodies is made smaller than those of the coupling sections. According to the aspect, the portion of the front-side lateral frame body that is located between the coupling sections coupled with both of the longitudinal frame bodies has a small external cross-sectional area to increase the distance from the panel and thus has low strength. However, because external cross-sectional areas of the coupling sections are kept not being decreased, original strengths thereof are also maintained, and thus it is possible to maintain strength as the seat cushion frame.

In the above aspect, the panel includes curve formation sections that are adjacent to fixing sections with both of the longitudinal frame bodies and that may be formed to have lower height between the fixing sections than the fixing sections. The concave portion of the front-side lateral frame body may receive a curved shape of the panel and a deformation starting section may be opposed under the curve formation sections of the panel such that a distance between the front-side lateral frame body and a lower surface of the panel becomes even as a whole in a longitudinal direction of the front-side lateral frame body. According to the aspect, the distance between the front-side lateral frame body and the lower surface of the panel is set even in the longitudinal direction of the front-side lateral frame body. Therefore, even when the panel is deformed at any place between the longitudinal frame bodies due to a vehicle collision, the energy-absorbing amount can be kept even, and the stable safety can be secured during collision.

In the above aspect, the panel may be formed to be tilted such that a portion thereof between the fixing sections is gradually lowered in height from the front side to the rear side, and the concave portion of the front-side lateral frame body may be formed to be tilted such that a panel-side surface is gradually lowered in height from the front side to the rear side along the shape of the panel. According to the aspect, it is possible to restrict a body of a passenger from sliding forward and downward, which is caused by the submarine phenomenon, with the tilted shape of the panel, and it is further possible to secure a deformation amount of the panel because the panel-side surface of the front-side lateral frame body is tilted along the shape of the panel. Therefore, it is possible to maintain energy-absorbing performance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 7:
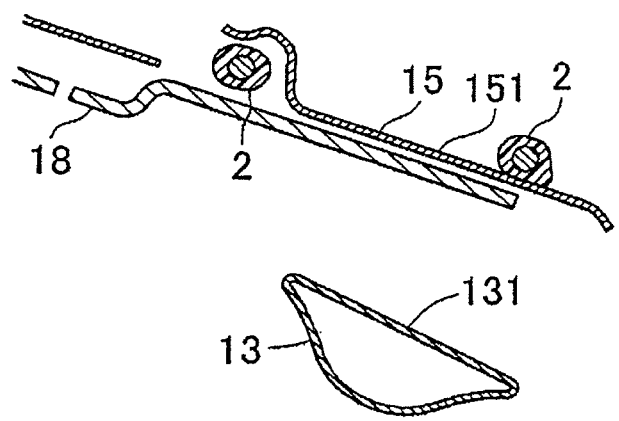
FIG. 7 is a cross-sectional view taken along the line VII-VII of FIG. 3.

As shown in FIGS. 1 to 4, a framework of a vehicular seat cushion 1 is formed such that longitudinal frame bodies 11, 12 are disposed parallel to each other on both sides along a traveling direction F of a vehicle and that the front side and the rear side between the longitudinal frame bodies 11, 12 are respectively coupled by lateral frame bodies 13, 14. A panel 15 is fixed to the front ends of both of the longitudinal frame bodies 11, 12 so as to cover a space between the longitudinal frame bodies 11, 12 that includes the front-side lateral frame body 13 from above. The front-side lateral frame body 13 is formed with a flat section 131 that is made by flattening the center on a side of a cylindrical pipe and is formed in a convex shape to increase a distance from the panel 15. The center on the side of the cylindrical pipe is near the center on a side surface of a cylinder in a longitudinal direction of the cylinder. FIG. 7 shows a cross-sectional view of the lateral frame body 13, and length of the flat section 131 in a longitudinal direction is longer than a diameter of the cylindrical pipe that constitutes the lateral frame body 13. The convex shape is formed in the front-side lateral frame body 13 such that a portion that is located between coupling sections 132 with the longitudinal frame bodies 11, 12 has a smaller external cross-sectional area than the coupling sections 132. Here, the external cross-sectional area is an area that a cross-sectional area of a pipe portion is added with an opening area of a hollow portion of the pipe. When the lateral frame body 13 is formed by a solid body, the external cross-sectional area is a cross-sectional area of the solid body as it is.

Figure 6:
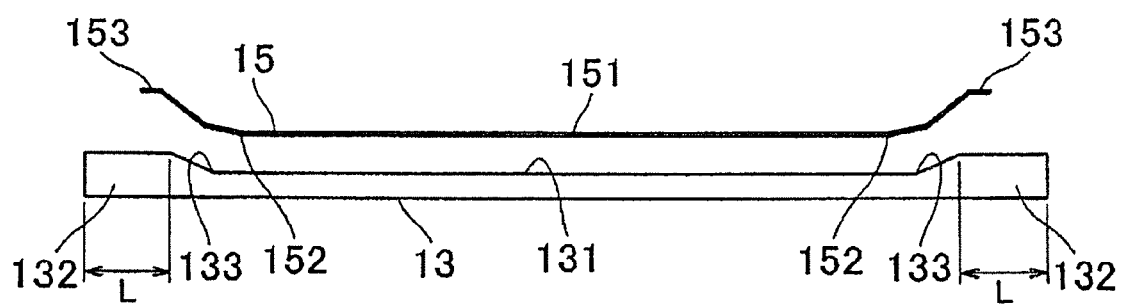
FIG. 6 is a view to explain a positional relationship between the front-side lateral frame body and a panel of the embodiment.

The panel 15 has curve formation sections 152 that is adjacent to fixing sections 153 with both of the longitudinal frame bodies 11, 12. The panel 15 is formed such that height of a flat section 151 between the fixing sections 153 is lower than those of both of the fixing sections 153. Meanwhile, the front-side lateral frame body 13 is formed in the convex shape as described above that receives a curved shape of the panel 15. In addition, in the front-side lateral frame body 13, deformation starting sections 133 are disposed under the curve formation sections 152 of the panel 15 such that a distance between the lateral frame body 13 and a lower surface of the panel 15 becomes even as a whole in the longitudinal direction of the lateral frame body 13. FIG. 6 shows this condition. However, as apparent from FIG. 3, while the curve formation sections 152 of the panel 15 are formed to be tilted in a lateral direction with respect to the travelling direction F of a vehicle, the deformation starting sections 133 of the lateral frame body 13 are formed in parallel with the travelling direction F of a vehicle. Accordingly, a positional relationship between the curve formation sections 152 and the deformation starting sections 133 changes slightly from a position shown in FIG. 6 in a width direction, depending on a position in a longitudinal direction. In FIG. 6, the deformation starting sections 133 are positioned closer to both ends of the lateral frame body 13 than the curve formation sections 152. In other words, the deformation starting section 133 is positioned closer to the end of the lateral frame body 13 than the curve formation section 152. This positional relationship is established in the vicinity of a backmost portion of the lateral frame body 13 when seen in FIG. 3; however, the deformation starting sections 133 are positioned closer to the center of the lateral frame body 13 than the curve formation sections 152 in the vicinity of a front portion of the lateral frame body 13 when seen in FIG. 3. As shown in FIG. 6, the coupling sections 132 of the front-side lateral frame body 13 with both of the longitudinal frame bodies 11, 12 have undeformed portions in a dimension L that are set to hold the lateral frame body 13 by a processing machine when the lateral frame body 13 goes through deformation processing.

In addition, the panel 15 is formed such that the flat section 151 between the fixing sections 153 is tilted to be gradually lowered in height from the front side to the rear side. Furthermore, the flat section 131 is formed to be tilted such that the height thereof is gradually decreased from the front side to the rear side along the shape of the panel 15 (see FIGS. 2, 4, and 7). In each of the drawings, portions that are not directly related to the present invention are not referred.

According to the above embodiment, because the panel 15 side of the front-side lateral frame body 13 is formed in the convex shape to increase the distance from the panel 15, the panel 15 can deform substantially when an impact load associated with a submarine phenomenon is applied thereto and thus it is possible to increase an energy-absorbing amount in a front side of a seat. In addition, a portion located between the coupling sections 132 of the front-side lateral frame body 13 with both of the longitudinal frame bodies 11, 12 has a small external cross-sectional area to increase the distance from the panel 15 and the strength thereof is low; however, because small external cross-sectional areas of both of the coupling sections 132 are maintained without being decreased, the original strength is also maintained to keep the strength as the seat cushion 1. Furthermore, the distance between the lateral frame body 13 and a lower surface of the panel 15 is set even in the longitudinal direction of the front-side lateral frame body 13. Therefore, even when the panel 15 is deformed at any portion between the longitudinal frame bodies 11, 12 due to a vehicle collision, the energy-absorbing amount can be kept even, and the stable safety can be secured during collision. Moreover, it is possible to restrict a body of a passenger from sliding forward and downward, which is caused by the submarine phenomenon, with the tilted shape of the panel 15, and it is further possible to secure a deformation amount of the panel 15 to maintain the energy absorbing performance because the flat section (a panel-side surface) 131 of the front-side lateral frame body 13 is tilted along the shape of the panel 15.

Figure 1:
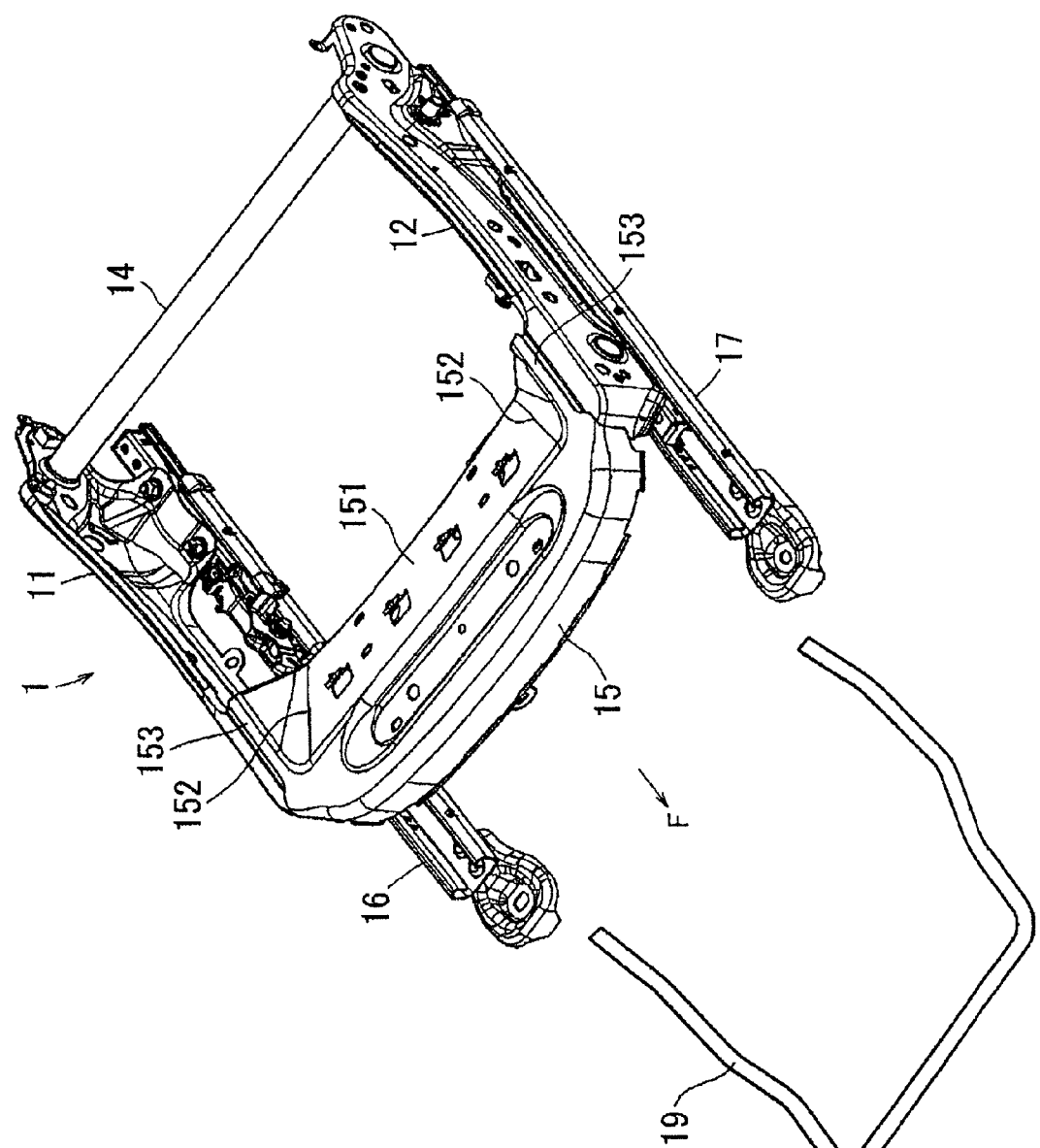
FIG. 1 is a perspective view of an embodiment according to the present invention.
Figure 2:
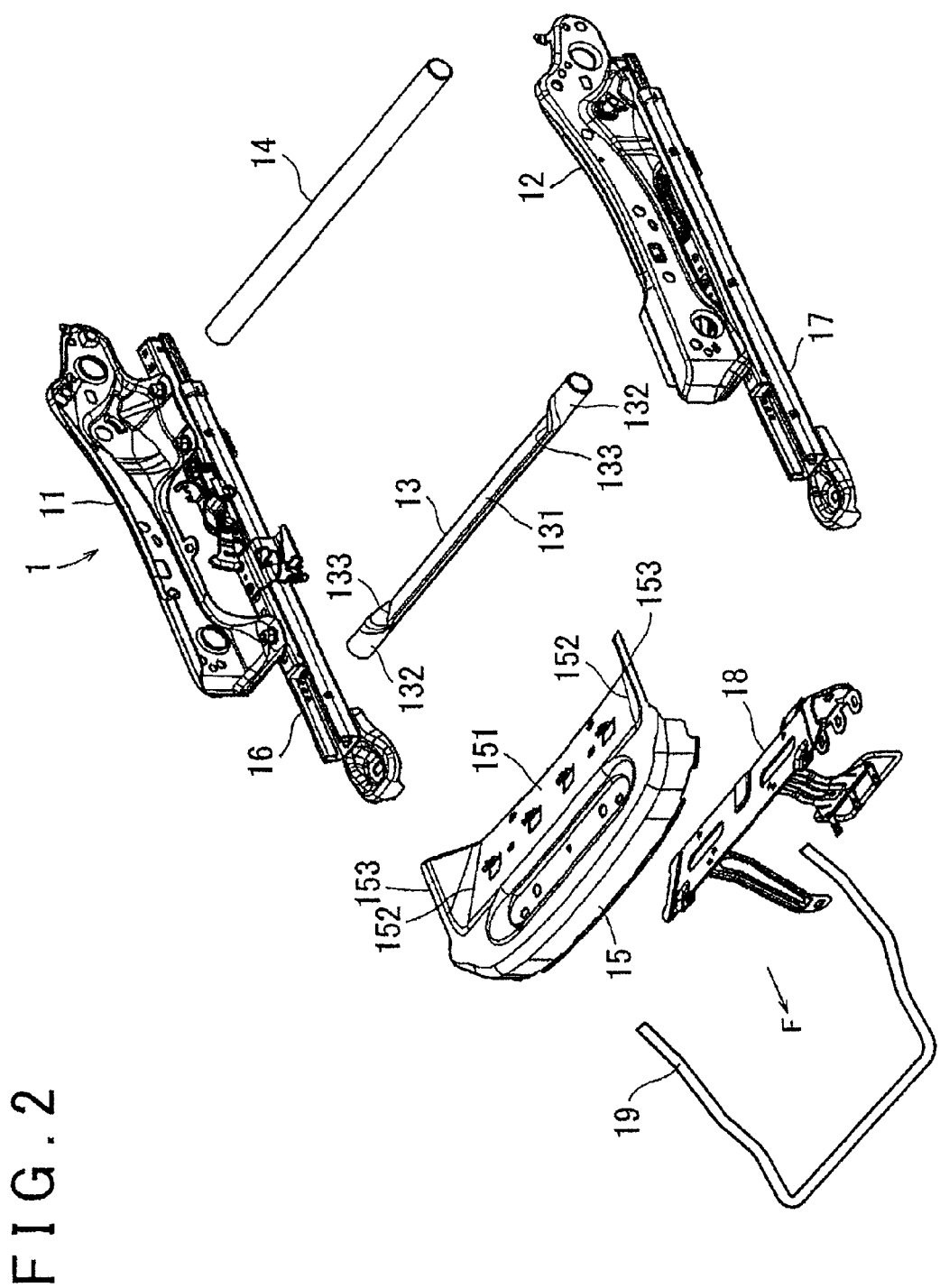
FIG. 2 is an exploded perspective view of the embodiment.
Figure 3:
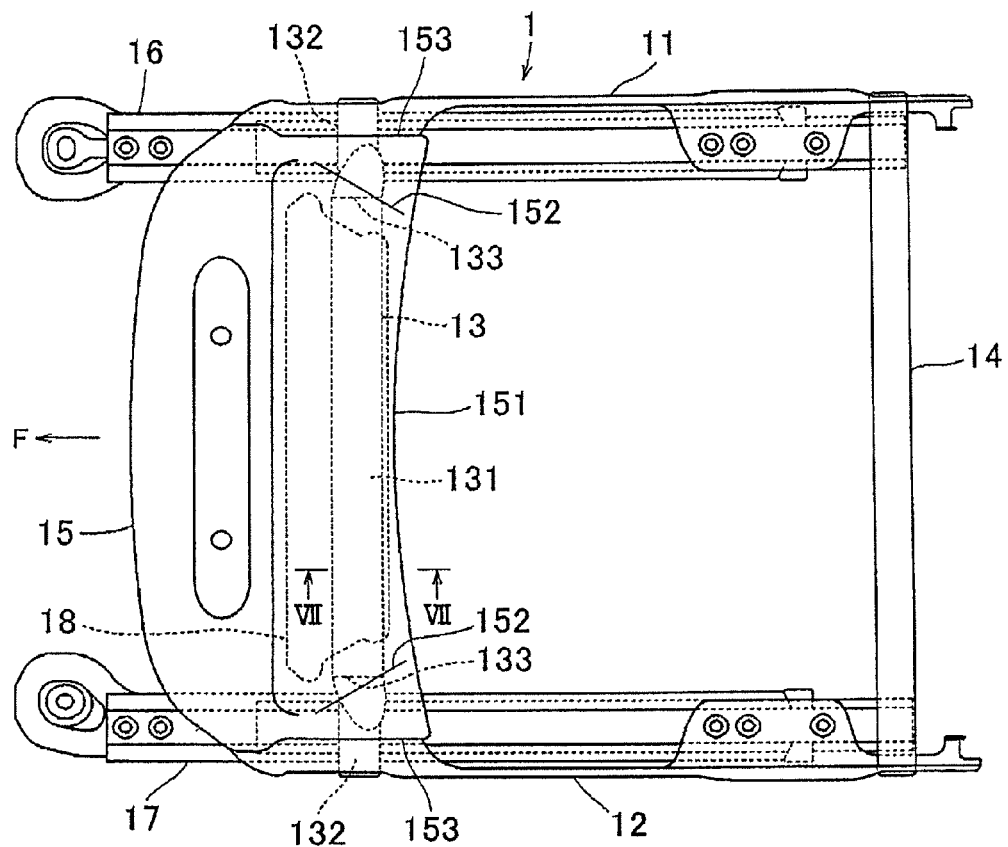
FIG. 3 is a plan view of the embodiment.
Figure 4:
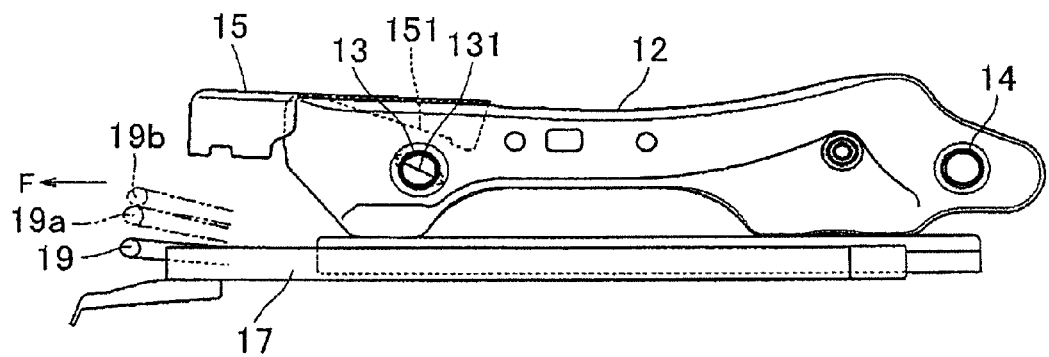
FIG. 4 is a side view of the embodiment.

As shown in a broken line in FIG. 3, a reinforced panel 18 is fixedly welded to a lower surface of the flat section 151 of the panel 15. As described above, the strength of the panel 15 is adjusted by adding the reinforced panel 18 to the panel 15, and the energy-absorbing amount that is obtained by deformation of the panel 15 in the vehicle collision is appropriately set. In addition, forward-backward sliding mechanisms 16, 17 are mechanisms to slide the seat cushion forward and backward, and a control lever 19 is a lever to control the forward-backward sliding mechanisms 16, 17. As shown in FIGS. 1 and 2, the control lever 19 is formed in a U shape that is convex in the traveling direction F of a vehicle as a whole, and it is configured such that, when a front side thereof is pulled upward to operate as it has been known, it is oscillated with a supporting point between a longitudinal direction of the control lever as the center thereof to unlock the forward-backward sliding mechanisms 16, 17 at paired rear ends. In FIG. 4, a position of the control lever 19 indicated by a solid line shows a position in which the control lever 19 is not operated, while a position of a control lever 19a indicated by a two-dot chain line shows a position in which the control lever 19 is pulled upward for operation to unlock the forward-backward sliding mechanisms 16, 17, and a position of a control lever 19b indicated by a two-dot chain line shows a position in which the control lever 19 is operated to the maximum upper position that is beyond a position where the forward-backward sliding mechanisms 16, 17 are unlocked. As described above, the control lever 19 is located below the lateral frame body 13 and is designed not to interrupt the lateral frame body 13 even when the control lever 19 is operated to the maximum upper position. When the lateral frame body 13 as a whole is formed to be convex downward to make the lateral frame body 13 in a concave portion, there is not enough room between the lateral frame body 13 and the control lever 19. However, when only the panel 15 side of the lateral frame body 13 is deformed to be formed in a concave portion as in the above embodiment, there is no impact on the room between the lateral frame body 13 and the control lever 19.

Figure 5:
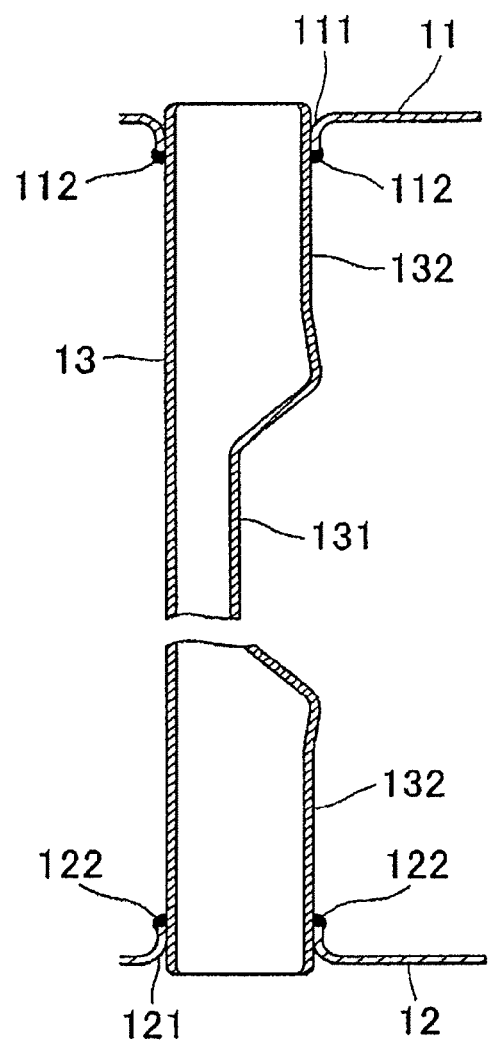
FIG. 5 is a view to explain a coupling state between a front-side lateral frame body and longitudinal frame bodies of the embodiment.
Figure 8A:
FIG. 8A is a cross-sectional view of a first modified example of the lateral frame body according to the embodiment.
Figure 8B:
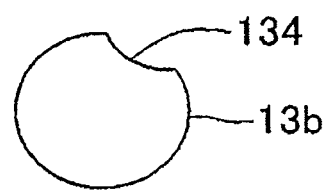
FIG. 8B is a cross-sectional view of a second modified example of the lateral frame body according to the embodiment.
Figure 8C:
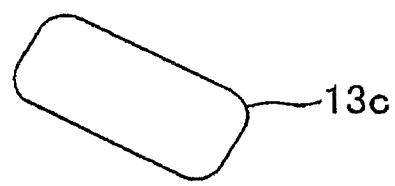
FIG. 8C is a cross-sectional view of a third modified example of the lateral frame body according to the embodiment.

In FIG. 7, a spring body 2 is stretched between the panel 15 and the rear-side lateral frame body 14, and this spring body 2 is coated with a resin around a spring material to be a shock absorbing material. FIG. 5 shows a coupling state between both of the longitudinal frame bodies 11, 12 and the front-side lateral frame body 13, and as apparent from FIG. 5, through holes 111, 121 are respectively drilled on the sides of the longitudinal frame bodies 11, 12 to correspond with both of the coupling sections 132 of the lateral frame body 13. Edge sections of the longitudinal frame bodies 11, 12 that form the through holes 111, 121 are fixedly welded to the coupling sections 132 of the lateral frame body 13 in a state where both of the coupling sections 132 of the lateral frame body 13 are inserted through these through holes 111, 121. FIG. 8 shows modified examples of the front-side lateral frame body 13, and each of lateral frame bodies 13a, 13b, and 13c in FIG. 8A to FIG. 8C is shown in cross section that corresponds to the lateral frame body 13 that is shown in cross section in FIG. 7. FIG. 8A is a first modified example that is an ellipse whose major axis is disposed on a parallel line with the flat section 151 of the panel 15. FIG. 8B is a second modified example in which a dent 134 is formed along the longitudinal direction of the lateral frame body 13 in a manner to face the flat section 151 of the panel 15. FIG. 8C is a third modified example that is formed in a rectangular shape whose longer side is disposed on a parallel line with the flat section 151 of the panel 15. Each of the lateral frame bodies 13a, 13b, and 13c secures a distance from the panel 15 and also secures strength by maintaining the external cross-sectional area in a necessary level. In the case of FIG. 8C, as in the flat section 131 of the lateral frame body 13 in the above embodiment (see FIG. 7), a surface on the panel 15 side is formed to be flat. Accordingly, when the panel 15 is deformed in a vehicle collision and abuts against the lateral frame body 13c, the lateral frame body 13c receives the panel 15 with the flat surface and thus can partially prevent an increase of a reaction force that a passenger experiences from the panel 15. The lateral frame bodies 13a, 13b, 13c of these modified examples may be formed as a hollow pipe or a solid rod.

The present invention is not limited to appearances or configurations that are described in the above embodiments, and various modified examples, additions, and deletions can be made within the gist of the present invention. For example, 1. a lateral frame body is not limited to a cylindrical shape but may be in a shape of a rectangular tube or a plate. For example, 2. The lateral frame body may be concave not only on a surface on a panel side but as a whole including a surface opposite from the panel side.

What is claimed is:

1. A seat cushion frame for a vehicle comprising:
   longitudinal frame bodies that are disposed on both sides of a seat cushion framework;
   a front-side lateral frame body that couples front portions of the longitudinal frame bodies, and a rear-side lateral frame body that couples rear portions of the longitudinal frame bodies; and
   a panel that is fixed to both of the longitudinal frame bodies to cover, from above, a space that is located between front ends of the longitudinal frame bodies and the front-side lateral frame body, wherein
   the panel is fixed to the longitudinal frame bodies such that the panel is spaced from the front-side lateral frame body along its entire length, and
   a panel side of the front-side lateral frame body includes a concave portion to increase a distance between the panel and the front-side lateral frame body.

2. The seat cushion frame for a vehicle according to claim 1, wherein
   the concave portion is provided in the front-side lateral frame body and located between coupling sections of the front-side lateral frame body coupled with both of the longitudinal frame bodies such that the concave portion has a smaller external cross-sectional area than the coupling sections.

3. The seat cushion frame for a vehicle according to claim 2, wherein
   the concave portion of the front-side lateral frame body that is located between the coupling sections is lower in strength than the coupling sections coupled with both of the longitudinal frame bodies.

4. The seat cushion frame for a vehicle according to claim 1, wherein
   the panel includes curve formation sections and fixing sections, the fixing sections being fixed with both of the longitudinal frame bodies and configured such that a height of a section of the panel, which is located between the fixing sections, is lower than a height of each of the fixing sections,
   the concave portion of the front-side lateral frame body is configured to receive the curve formation sections of the panel, and
   deformation starting sections of the front-side lateral frame body are opposed to the curve formation sections of the panel from a lower side of the curve formation sections such that a distance between the front-side lateral frame body and a lower surface of the panel is uniform in a longitudinal direction of the front-side lateral frame body.

5. The seat cushion frame for a vehicle according to claim 4, wherein
   the deformation starting sections are positioned closer to outer ends of the front-side lateral frame body than the curve formation sections.

6. The seat cushion frame for a vehicle according to claim 1, wherein
    the panel is tilted such that a portion thereof between fixing sections of the panel is gradually lowered in height from a front side of the panel to a rear side of the panel, the fixing sections of the panel being fixed with both of the longitudinal frame bodies, and
    the concave portion of the front-side lateral frame body is tilted such that a panel-side surface is gradually lowered in height from a front side of the front-side lateral frame body to a rear side of the front-side lateral frame body along the panel.

7. The seat cushion frame for a vehicle according to claim 1, wherein the concave portion is provided below a lowermost end of the panel.

8. A seat cushion frame for a vehicle comprising:
    longitudinal frame bodies that are disposed on both sides of a seat cushion framework;
    a front-side lateral frame body that couples front portions of the longitudinal frame bodies, and a rear-side lateral frame body that couples rear portions of the longitudinal frame bodies; and
    a panel that is fixed to both of the longitudinal frame bodies to cover, from above, a space that is located between front ends of the longitudinal frame bodies and the front-side lateral frame body, wherein
    a panel side of the front-side lateral frame body includes a concave portion to increase a distance between the panel and the front-side lateral frame body, and the concave portion is provided below a lowermost end of the panel.

9. The seat cushion frame for a vehicle according to claim 8, wherein
    the concave portion is provided in the front-side lateral frame body and located between coupling sections of the front-side lateral frame body coupled with both of the longitudinal frame bodies such that the concave portion has a smaller external cross-sectional area than the coupling sections.

10. The seat cushion frame for a vehicle according to claim 9, wherein
    the concave portion of the front-side lateral frame body that is located between the coupling sections is lower in strength than the coupling sections coupled with both of the longitudinal frame bodies.

11. The seat cushion frame for a vehicle according to claim 8, wherein
    the panel includes curve formation sections and fixing sections, the fixing sections being fixed with both of the longitudinal frame bodies and configured such that a height of a section of the panel, which is located between the fixing sections, is lower than a height of each of the fixing sections,
    the concave portion of the front-side lateral frame body is configured to receive the curve formation sections of the panel, and
    deformation starting sections of the front-side lateral frame body are opposed to the curve formation sections of the panel from a lower side of the curve formation sections such that a distance between the front-side lateral frame body and a lower surface of the panel is uniform in a longitudinal direction of the front-side lateral frame body.

12. The seat cushion frame for a vehicle according to claim 11, wherein
    the deformation starting sections are positioned closer to outer ends of the front-side lateral frame body than the curve formation sections.

13. The seat cushion frame for a vehicle according to claim 8, wherein
    the panel is tilted such that a portion thereof between fixing sections of the panel is gradually lowered in height from a front side of the panel to a rear side of the panel, the fixing sections of the panel being fixed with both of the longitudinal frame bodies, and
    the concave portion of the front-side lateral frame body is tilted such that a panel-side surface is gradually lowered in height from a front side of the front-side lateral frame body to a rear side of the front-side lateral frame body along the panel.

* * * * *